United States Patent [19]
Pinaire et al.

[11] Patent Number: 5,291,989
[45] Date of Patent: Mar. 8, 1994

[54] CATALYST SYSTEM FOR DISTILLATION REACTOR

[75] Inventors: Ronald Pinaire; Michael A. Ulowetz; Timothy P. Nace; David A. Furse, all of Wichita, Kans.

[73] Assignee: Koch Engineering Company, Inc., Wichita, Kans.

[21] Appl. No.: 775,010

[22] Filed: Oct. 11, 1991

Related U.S. Application Data

[62] Division of Ser. No. 475,971, Feb. 6, 1990, Pat. No. 5,108,550.

[51] Int. Cl.⁵ .............................. B01D 3/32; B01J 8/04
[52] U.S. Cl. .................................. 202/158; 202/267.2; 203/29; 203/99; 203/DIG. 6; 261/112.2; 422/190; 422/193; 422/216
[58] Field of Search .................. 203/29, 99, DIG. 6; 202/158, 267.2; 261/112.1, 112.2, 95, 114.3; 422/191, 193, 216, 190, 192, 212, 186, 196; 502/527

[56] References Cited

U.S. PATENT DOCUMENTS

| | | | |
|---|---|---|---|
| 2,676,875 | 4/1954 | Barr | 422/191 |
| 3,541,000 | 11/1970 | Hanson et al. | 208/108 |
| 3,629,478 | 12/1971 | Haunschild | 203/38 |
| 3,634,535 | 1/1972 | Haunschild | 203/28 |
| 3,882,167 | 5/1975 | Lohmar et al. | 203/DIG. 6 |
| 4,126,539 | 11/1978 | Derr, Jr. et al. | 208/146 |
| 4,213,847 | 7/1980 | Chen et al. | 203/DIG. 6 |
| 4,302,356 | 11/1981 | Smith, Jr. | 502/159 |
| 4,307,254 | 12/1981 | Smith, Jr. | 568/697 |
| 4,439,350 | 3/1984 | Jones, Jr. | 502/240 |
| 4,443,559 | 4/1984 | Smith, Jr. | 502/300 |
| 4,471,154 | 9/1984 | Franklin | 203/DIG. 6 |
| 4,540,831 | 9/1985 | Briggs | 203/DIG. 6 |
| 4,579,647 | 4/1986 | Smith | 208/111 |
| 4,620,952 | 11/1986 | Hsieh | 261/114.4 |
| 4,623,454 | 11/1986 | Tauscher et al. | 261/112.2 |
| 4,722,780 | 2/1988 | Franck et al. | 208/65 |
| 4,731,229 | 3/1988 | Sperandio | 422/191 |
| 4,847,431 | 7/1989 | Nocca et al. | 422/193 |
| 5,026,459 | 6/1991 | Quang et al. | 202/158 |
| 5,073,236 | 12/1991 | Gelbein et al. | 203/DIG. 6 |

FOREIGN PATENT DOCUMENTS

2034597 11/1979 United Kingdom.

*Primary Examiner*—Virginia Manoharan
*Attorney, Agent, or Firm*—Shook, Hardy & Bacon

[57] ABSTRACT

A reaction with distillation structure utilizes a plurality of distillation trays and interconnecting catalyst containers which provide a catalytic reaction zone and a primary flow path for descending liquid streams. Catalytic reaction of the liquid streams within the catalyst reaction zone formed in the containers occurs concurrently with fractionation of the reaction products on the distillation trays. The containers preferably extend continuously through the reaction zone of the distillation reactor to allow for dump loading and removal of the solid particulate catalyst. Structure may also be provided within the containers to influence system hydraulics through the accumulation of liquid within the catalyst bed. This is done by providing an open area interiorly of the catalyst bed into which liquid on the distillation and fractionation tray is radially driven. This open area communicates with a liquid accumulation zone wherein liquid accumulates until a sufficient liquid head drives the liquid radially outward for further contact with the catalyst bed.

28 Claims, 3 Drawing Sheets

CATALYST SYSTEM FOR DISTILLATION REACTOR

This is a divisional of copending application Ser. No. 07/475,971, filed on Feb. 6, 1990, now U.S. Pat. No. 5,108,550.

BACKGROUND OF THE INVENTION

This invention relates in general to a mass transfer or distillation column reactor and, more particularly, to a structure within the reactor for concurrently contacting a fluid stream with a particulate solid catalyst while distilling the reaction product.

Conventional structures for carrying out catalytic reactions within distillation columns generally comprise containers which are filled with catalyst and are arranged within the column to concurrently serve as a catalytic and distillation structure. The catalytic chemical reaction zones are thus combined with the mass transfer zones in these types of structures, making control of the quantity of fluid entering the mass transfer zones difficult, at best.

Another limitation of known structures which allow concurrent reaction with distillation is the difficulty encountered in replacing the catalyst when it is spent. To renew the catalyst, the internal structure must be removed from the reactor shell, reloaded with catalyst and repositioned in the reactor. At best, this is a time consuming and labor intensive procedure. In some instances, it may only be accomplished by personnel entering the column and physically removing and replacing the internal structures. The catalyst in some types of structures is maintained in cloth belts which are joined with a steel wire support structure. Replacement of the catalyst in these structures requires removal and renewal of both the support structure and the catalyst belt. Significant losses in operating time of the column thus result from renewal of the catalyst, especially when catalysts which have a cycle life as short as several months are utilized. In addition, personnel entering the column to replace the catalyst must exercize extreme caution, especially when hazardous chemicals have been charged to the column.

SUMMARY OF THE INVENTION

It is an object of this invention to provide a method for concurrently catalytically reacting and distilling fluid streams within a mass transfer or distillation column in a manner which allows greater control over the reaction process within the column.

It is also an object of this invention to provide a structure within a mass transfer or distillation column which allows concurrent reaction with distillation of fluid streams and which utilizes both reaction and mass transfer zones to achieve greater reaction process efficiency.

It is a further object of this invention to provide a structure within a distillation column or mass transfer column which allows concurrent reaction with distillation of fluid streams and which allows easy replacement of spent catalyst so that operational downtime is minimized.

It is a still further object of this invention to provide a structure within a distillation or mass transfer column which allows concurrent reaction with distillation of fluid streams and which allows for replacement of spent catalyst without exposing personnel to the safety risk incurred in entering the column.

It is also an important aim of this invention to provide a method and structure for concurrently catalytically reacting and distilling fluid streams which has the ability to accommodate relatively high liquid flow rates.

An object of the invention herein described is also to provide for maximum system hydraulics in a catalytic reaction and distillation method and structure by providing different mass transfer devices in the catalyzed and noncatalyzed zones.

Still another one of the objects of our invention is to provide a method and structure for concurrently catalytically reacting and distilling fluid streams wherein provision is made for driving reactant fluid through the catalyst bed thereby maximizing fluid flow and process efficiency.

To accomplish these and other related objects of the invention, a distillation or mass transfer column is provided with structure for containing a catalyst bed, such as containers which extend between layered trays or other mass transfer devices within the column. The containers provide pathways or channels through which the liquid phase of the fluid stream is directed and provide zones for catalytic chemical reaction separate from the distillation zones provided by the trays. This use of separate reaction and mass transfer zones allows the quantity of material entering each zone to be regulated by a process which in broadest scope encompasses the steps of:

(a) feeding a fluid stream to the column;
(b) contacting the liquid phase of the fluid stream with a particulate solid catalyst bed extending between a plurality of mass transfer devices to catalytically chemically react components of the liquid phase;
(c) directing a vapor stream to the column;
(d) directing said liquid and vapor phases to the mass transfer devices for mass transfer between the liquid and vapor phases; and
(e) controlling the flow of the liquid phase through the catalyst bed and to the mass transfer devices.

It will be appreciated by those skilled in the art that one or more of the foregoing steps may occur concurrently with other steps.

BRIEF DESCRIPTION OF THE DRAWINGS

In the accompanying drawings in which like reference numerals are used to indicate like parts in the various views.

DESCRIPTION OF THE PREFERRED EMBODIMENT

Figure 1:
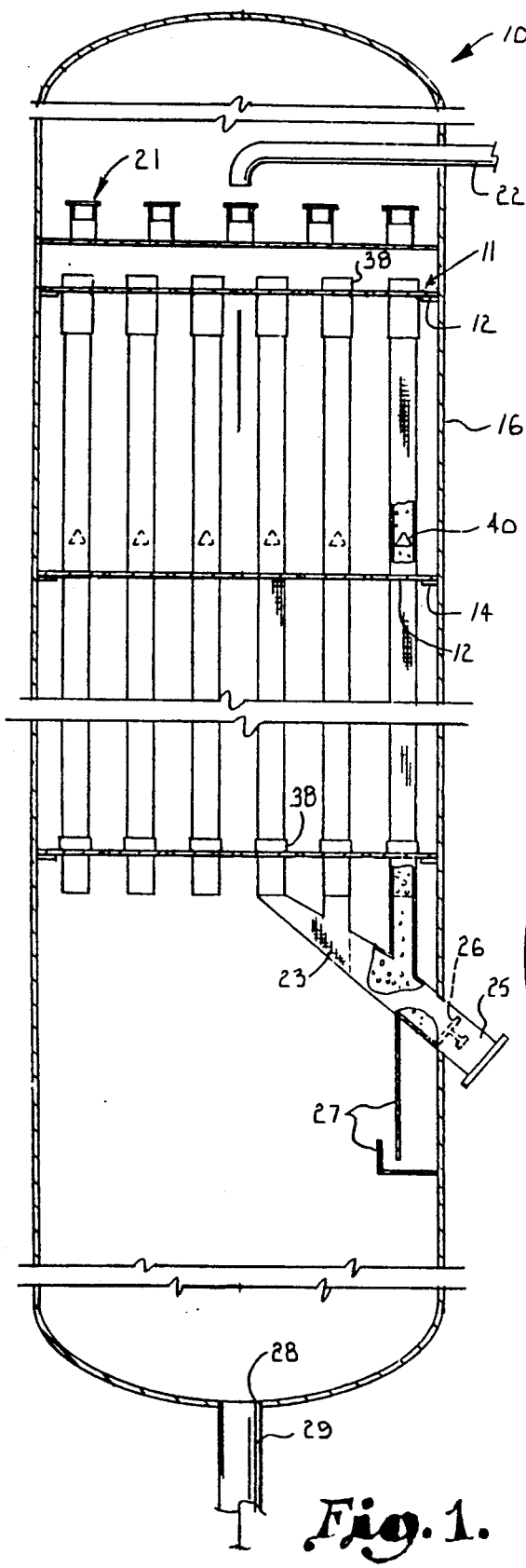
FIG. 1 is a fragmentary elevational view of a distillation column shown with portions broken away to illustrate the structure of the present invention.
Figure 2:
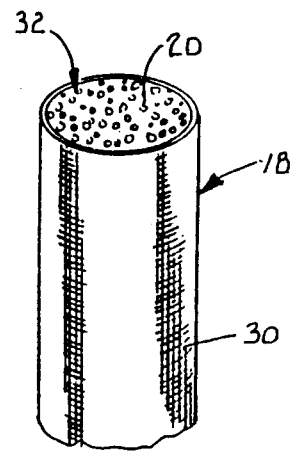
FIG. 2 is a fragmentary, side perspective view of a catalyst downcomer according to the invention.
Figure 3:
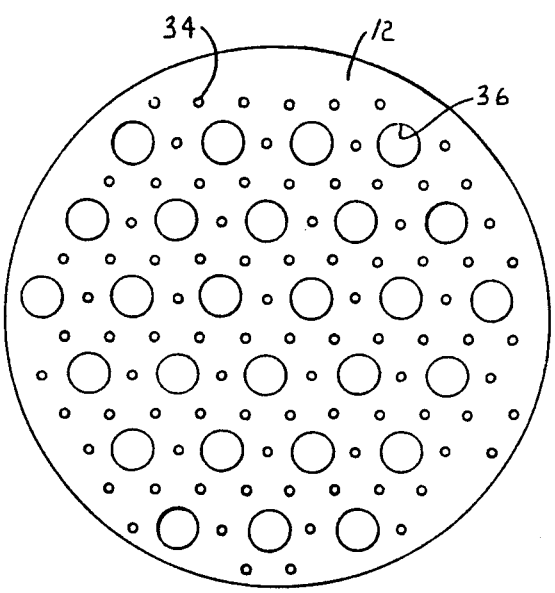
FIG. 3 is a top plan view of a mass transfer tray utilized in the present invention.

Turning now to the drawings in greater detail, and especially to the embodiment of the invention shown in FIGS. 1–3, a distillation column tower reactor broadly designated by the numeral 10 includes a structure 11 which allows concurrent reaction with distillation of fluid streams within the column. Structure 11 comprises a plurality of vertically spaced apart and horizontally extending mass transfer devices in the form of distillation trays 12 which are supported by brackets 14 attached to the interior of column reactor shell 16. Structure 11 also includes a plurality of horizontally spaced containers in the form of vertically extending downcomers 18 formed from a liquid/vapor permeable rigid material, preferably screen wire. Containers 18 are filled with solid catalyst particles 20 and extend vertically through a plurality of trays 12.

A suitable liquid distributor in the form of a chimney type distillation tray 21 is positioned above uppermost tray 12 for receiving a liquid feed from another section of the column and distributing it over the entire surface area of the column defined by shell 16. The lowermost ends of downcomers 18 are coupled with a manifold 23 constructed of the same material as the downcomers. Manifold 23 includes a dump nozzle 25 and is normally closed by a removable plug 26. It should be understood that a plurality of manifolds 23 will be positioned in the lower section of shell 16 so as to couple all of the downcomers 18 with a manifold and its associated cleanout nozzle.

In the most typical application of the invention, the foregoing-described combination will comprise one section of a tower, and liquid from downcomers 18 will be received by a collector/distributor for ultimate transfer to a primary distillation section of the tower. Positioned beneath manifold 23 is a weir structure 27 for receiving liquid from manifold 23, collecting the liquid and ultimately distributing it to the fractionation section of the column. It is to be understood that the weir 27 extends in an annular configuration around the interior surface of shell 16. Ultimately, a bottoms line 29 is provided to direct bottoms liquid from the reactor at the point where no further mass transfer or reaction is desired.

As best shown in FIG. 2, each downcomer 18 is generally cylindrical in configuration (although the invention is not limited to cylindrical configurations) and comprises a liquid permeable outer wall 30 of wire mesh surrounding a catalyst bed 32 formed by catalyst particles 20. It is to be understood that configurations other than cylindrical may also be utilized for the downcomers. The wall 30 may comprise various screen materials suitable for retaining the catalyst particles 20 while providing the necessary liquid and vapor permeability. Alternatively, the wall may comprise a sheet metal or other material formed in the desired configuration and having slots sized to permit liquid and vapor permeability while preventing passage of the catalyst particles. Preferably, wall 30 comprises a wire gauze or metal screen material but other types of material such as plastic gauze, glass fiber cloth, and ceramics, all of which have the desired characteristics, may also be utilized.

The catalyst bed 32 may comprise any solid particulate catalyst 20 which is suitable for the applicable reaction occurring within the catalyst bed. The catalyst 20 may be an acid or basic catalyst or may comprise catalytic metals and their oxides, halides or other chemically reacted states. Molecular sieves may also be utilized as the catalyst. The catalyst chosen should be heterogeneous with the system reaction and the fluid streams. By way of example, acid cation exchange resins may be used for dimerization, polymerization, etherification, esterification, isomerization, and alkylation reactions. Other catalysts such as molecular sieves, magnesia, chromia and brucite may be used for isomerization reactions.

Distillation trays 12 are of a typical sieve-type plate construction, as best illustrated in FIGS. 1 and 3, which is employed to provide for vapor and liquid contacting as liquid flows over the tray surface. Other types of trays such as valve trays, bubble cap trays and jet tab trays may be utilized in place of or in conjunction with trays 12. The trays are configured to the internal size and shape of reactor shell 16 and are vertically spaced at the desired positions within the reactor 10. A plurality of small apertures 34 formed in the trays provide for ascending vapor passage and thus vapor-liquid phase interaction. A plurality of larger apertures 36 are provided to accommodate downcomers 18 which extend through the trays and are held in place by upper and lower fittings 38.

The distribution of the large and small apertures 34 and 36 in each tray is determined by the specific catalytic process desired. The apertures may be distributed in offset rows and columns such that an equilateral triangle is formed when drawing an imaginary line between an aperture in one row and the two nearest apertures in an adjacent row. In a typical installation, the large apertures 36 may comprise approximately 19% of the total surface area of the tray and the small apertures 34 may comprise approximately 1.7% of the total surface area. In a tray with a three foot diameter this spacing density is obtained if the large apertures and thus the downcomers 18 are of a three inch diameter with a six inch spacing between the centers of adjacent downcomers. The small apertures are spaced three inches apart on center and have a diameter of approximately 0.5 inches. The spacing density of the apertures may be varied as desired to optimize either the cross-sectional area of the large apertures 36 or the cross-sectional area of the small apertures 34. A preferred upper limit of the surface area of the large apertures 36 is approximately 32% of the total tray surface area.

The downcomers 18 extend downwardly from one tray 12 to a lower tray to provide a liquid passage between the trays. The downcomers may extend continuously through a plurality of successive trays and then terminate above the upper surface of a lower tray with a suitable closure permitting liquid flow through the lower end of the downcomer while maintaining the catalyst within the downcomer. It is preferred, however, that the downcomers extend continuously through each tray 12 so that a continuous passage is provided for removal and loading of the catalyst bed. The mesh construction of downcomers 18 is particularly advantageous since it provides a very large and effective surface area for holding the liquid phase which contacts it thus promoting mass transfer between the liquid and the vapor phase.

Liquid flow through the downcomers 18 may also be regulated by incorporating suitable flow restrictors such as conical shaped hats 40 within downcomers 18 to interrupt or restrict the downward flow of liquid and partially divert it from the downcomer onto the underlying tray 12. Various types of restrictors may be utilized for effecting this result, but it is preferred that the restrictors be suitable for loading with the catalyst, as are hats 40.

In operation, one or more fluid streams are directed to a section of reactor 10 through line 22. The fluid streams are directed by distributor tray 21 onto sieve tray 12 from which liquid enters the upper ends of the downcomers 18 and flows downwardly through catalyst bed 32 contained therein. Catalytic reaction of the fluid streams occurs as they flow through the catalyst bed which presents the catalytic reaction zone. As a fluid head develops, the liquid flowing through the reaction zone weeps through the walls 30 of the downcomers and descends along the outer surface of walls 30 onto the upper surface of distillation trays 12 where mixing and fractionation of the liquid occurs. Some mass transfer also occurs on the surface of wall 30. After leaving the tray 12, the liquid progressively descends through the reaction and distillation zones with at least some of the liquid passing the reaction zones of downcomers 18 and eventually reaching the bottom of the tower where it is drawn off through line 29 or directed to a distillation zone of the column. Typically, a reboiler (not shown) is utilized to vaporize a portion of the liquid bottoms which is returned to the reactor.

As the liquid phase is descending through the downcomers 18, the vapor phase which is typically generated by distillation of the liquid phase (but could be from another source) ascends through the smaller apertures 34 in the trays and intermixes with the liquid phase which passes out of the porous downcomers. The primary mass transfer between the liquid and vapor phases occurs on the trays but some also occurs within the catalytic reaction zone and in particular on the surfaces of walls 30. Thus, it is preferred that the downcomer wall 30 be vapor permeable as well as liquid permeable to permit removal of the vapor phase from the downcomers. After the vapor phase progresses to the top of the reactor 10 it may be further processed in a fractionation section of the reactor or may be condensed and a portion of the condensate returned to the reactor as a reflux. These products may be further processed within the reactor and/or removed from the reactor in a manner well known to those skilled in the art.

Figure 4:
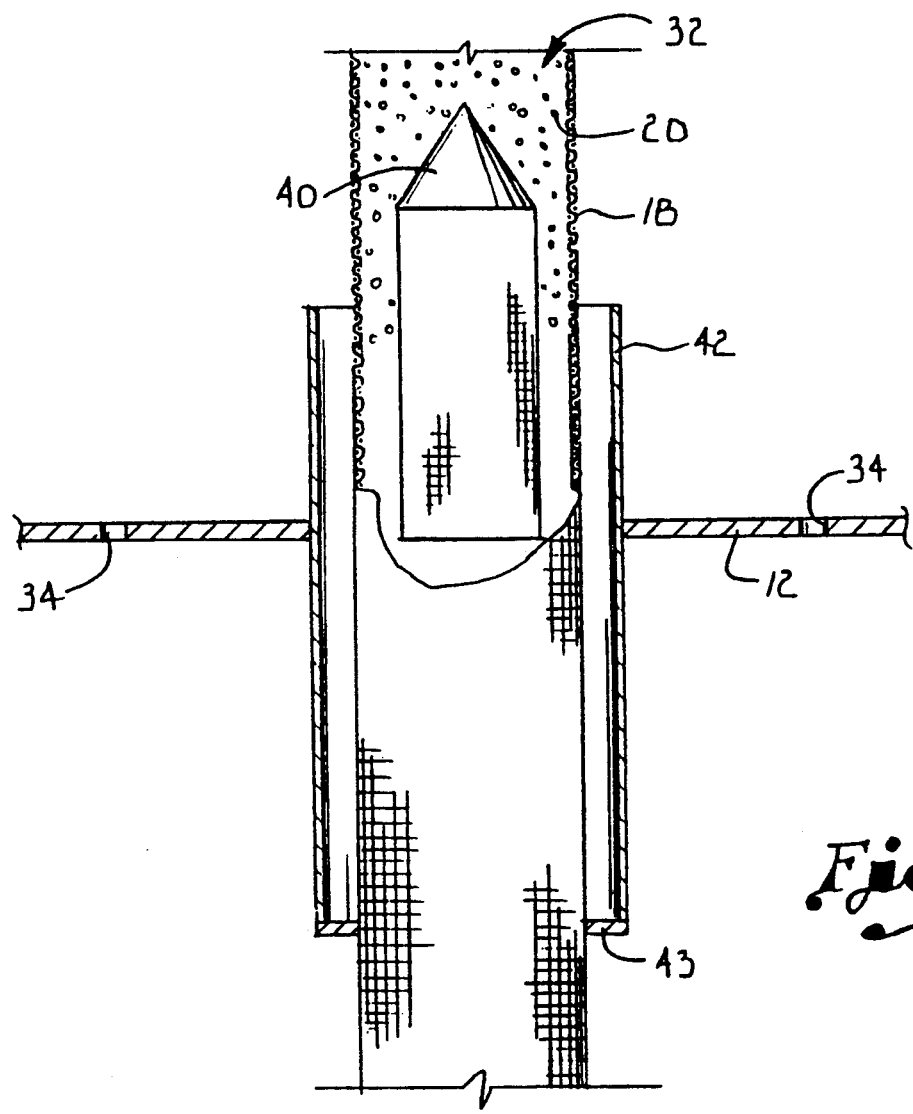
FIG. 4 is a cross-sectional view of an alternative form of the invention with portions broken away to illustrate details of construction.

An alternative embodiment of the invention is shown in FIG. 4 where a solid cylindrical weir 42 is provided in concentric relationship to downcomer 18. Weirs 42 are provided on the upper surface of one or more trays 12 (the tray illustrated in FIG. 3 does not contain weirs 42) to increase the liquid mixing and fractionation on the upper surface of the tray. The weirs are of a uniform height and encircle the large apertures 36 in spaced relationship to downcomers 18 to prevent re-entry of liquid from the tray into the downcomers until the liquid level on the tray exceeds the height of the weirs.

Each weir 42 is provided with an end closure 43 at its lowermost end so as to preclude liquid from passing out of the end before it travels through downcomer 18. This alternative embodiment of the invention is utilized to provide further control over the liquid flowing through the downcomers and to increase the contact time between liquid and vapor phases in the reaction zone presented by downcomers 18. Utilization of the alternative form of the invention and the method carried out thereby is substantially the same as that previously described for the embodiment of FIGS. 1-3.

Figure 5:
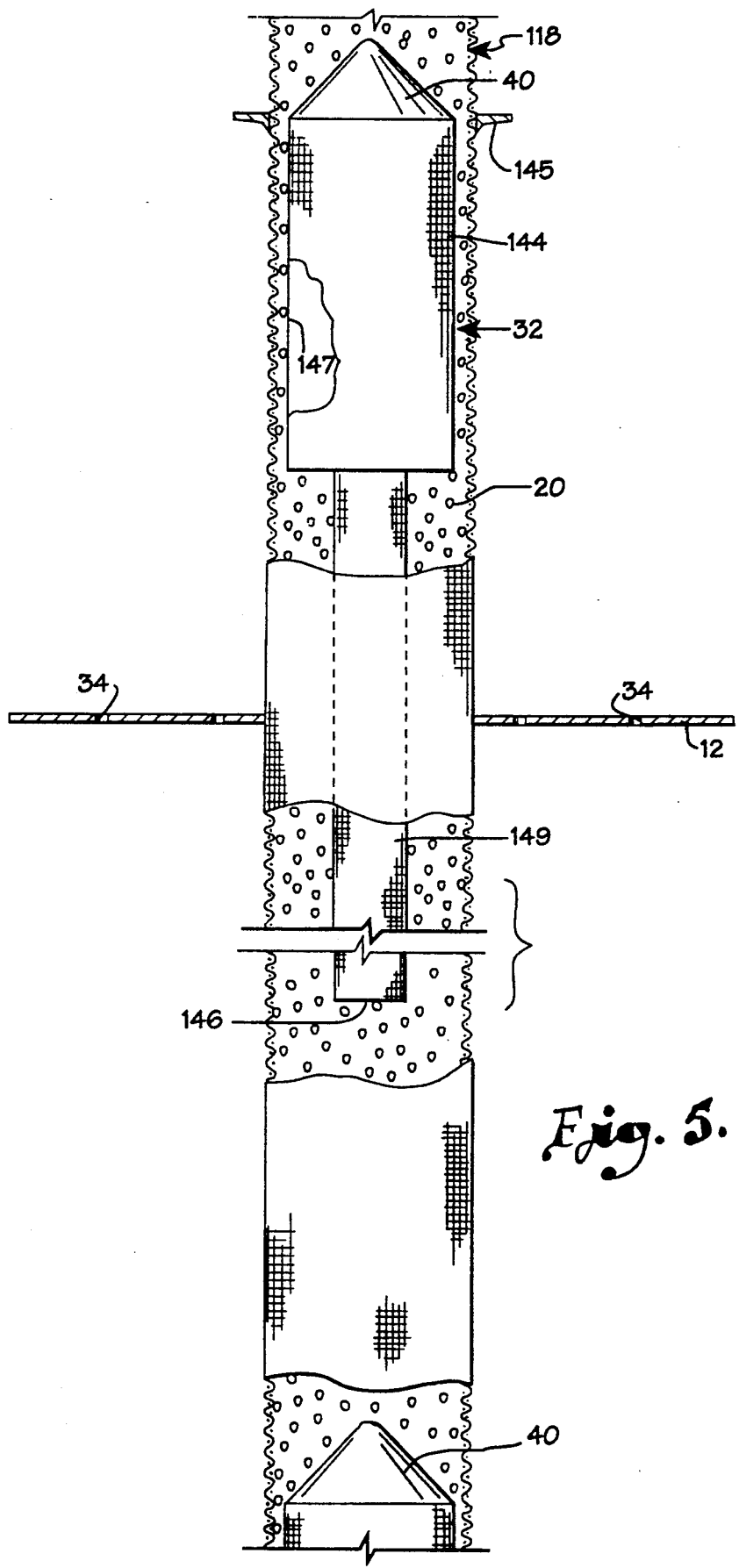
FIG. 5 is an elevational view with portions broken away and shown in cross-section of another form of the invention.

The preferred embodiment of the invention is shown in FIG. 5. In this embodiment, the catalyst containing structures are designated generally by the numeral 118 and are again of cylindrical wire mesh construction to present a continuous downcomer passing through a plurality of plates in the form of distillation trays 12 having sieve openings 34. Included within downcomer 118 is a cylindrical member 144 which is concentric with and inwardly spaced from the outer wall of the downcomer. Member 144 is preferably formed from a mesh material which presents an open area 147 inside of catalyst bed 32 which is in communication with the catalyst bed through the openings in the screen mesh. The size of the mesh is selected so as to accommodate liquid flow between the catalyst bed and the open area through the screen while precluding catalyst particles 20 from entering the open area. The upper end of cylindrical member 144 is closed by a solid hat structure 40 of the type previously described which diverts liquid flowing down through the column to the walls of container 118. A wiper band 145 interrupts the flow of any liquid passing down the outside wall of container 118.

At its lowermost end, cylindrical member 144 communicates with a second cylindrical member 146 which is of a smaller diameter than that of member 144 and is also concentric with and inwardly spaced from the walls of container 118. The second cylindrical member 146 is also comprised of a mesh material and presents a liquid accumulation zone 149. The member 146 extends from the bottom of cylindrical member 144 to a point spaced above the hat structure 40 that is below tray 12.

Utilization of the alternative form of container 118 and the associated cylindrical members 144 and 146 follows the same procedure previously discussed for the other embodiments of the invention. The presence of the large open area 147 presented by member 144 allows for much higher flow volumes of liquid through the column. The smaller cross-sectional area defined by member 146 in comparison with the cross-sectional area of member 144 causes liquid to accumulate in zone 149. The accumulated liquid will gradually move radially outward through screen 146 and the surrounding catalyst bed once the liquid head reaches a certain level.

Utilization of container 118 with associated screen members 144 and 146 in the configuration shown in FIG. 5 is analogous to the procedure previously described for the embodiment shown in FIGS. 1-3. Liquid accumulates on tray 12 and is eventually driven radially through the catalyst bed into surrounding member 144 and into the open area presented thereby. This liquid phase will then accumulate within zone 149 and, when the head created by the accumulating liquid reaches a predetermined design level, it will pass radially outward from this zone through catalyst bed 32 and eventually gravitate downwardly until it reaches the next adjacent hat 40 where it is again forced to the wall of container 118 and the process is repeated with the next lower tray 12. Mass transfer occurs both on the tray where distillation and fractionation of the liquid occurs, and on the surfaces of downcomers 118 and members 144 and 146. As the liquid descends through the reactor, reaction takes place in the reaction zone presented by catalyst bed 32. As previously discussed in conjunction with the embodiment of FIGS. 1-3, liquid reaching the bottom of the reactor is directed to another zone of the same column. While members 144 and 146 are normally used in association with one another, it will be appreciated that either one could be employed individually to obtain certain control over liquid flow without employment of the other.

It can thus be seen that the reaction with distillation structure which comprises downcomers 18 and 118 together with trays 12 inside of a column presented by shell 16 provides the important feature of zones wherein fractional distillation primarily occurs and zones where catalytic reaction primarily occurs. The catalyst bed 32 contained within the downcomers provides the catalytic reaction zone and also serves as the primary passage for liquid streams descending between trays 12 to ensure that thorough liquid and catalyst contacting occurs. The distillation trays 12 provide the primary fractional distillation zone for mass transfer between the liquid and vapor phases. By providing these separate zones for concurrent fractional distillation and catalytic reaction, enhanced process efficiency is obtained. Control over the system reaction may also be maintained by regulating the quantity of liquid flowing through the catalyst zone. With increasing flow rates more of the liquid phase weeps through the walls 30 of the downcomers and enters the mass transfer zones on the trays 12. The quantity of material entering the mass transfer zones can thus be controlled by regulation of the liquid flow rate or other process parameters which in turn control the liquid flow rate.

To effect removal of catalyst 20 from within the downcomers 18 and 118, plug 26 may be removed and catalyst 20 dumped through outlet nozzle 25. After removal of chimney type distributor tray 21, the catalyst may be recharged by loading it directly into the downcomers 18 and 118.

The construction of reaction with distillation structure 11 thus provides the added feature of allowing removal and recharging of the catalyst 20 without requiring removal of the catalytic distillation support apparatus. This significantly reduces the operational downtime which would otherwise be encountered if dismantling of the entire structure 11 were required, especially if catalysts having a short cycle life are utilized.

From the foregoing, it will be seen that this invention is one well adapted to attain all the ends and objects hereinabove set forth as well as other advantages which are likely to become apparent upon utilization of the invention in commercial applications.

It will be understood that certain features and subcombinations of the invention disclosed are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described the invention, what is claimed is:

1. An apparatus for use in a distillation column to provide concurrent reaction with distillation of fluid streams flowing through said distillation column, said apparatus comprising:
    a plurality of spaced apart plates for presenting a fractional distillation and mass transfer zone;
    a plurality of containers extending between said plates for containing in a fixed configuration a catalyst to form a catalytic reaction zone, said containers providing a primary flow path for liquid streams flowing between said spaced apart plates; and
    solid members in surrounding relationship to at least some of said containers and having upper and lower ends, each said member being spaced from an associated container and coupled with the latter in fluid-tight relationship at the lower end of the member.

2. The apparatus of claim 1, wherein said containers have a permeable outer wall.

3. The apparatus of claim 2, wherein said container outer walls comprise a screen material.

4. The apparatus of claim 1, wherein said plates contain a plurality of apertures sized for receiving said containers to allow said containers to extend through the plates.

5. The apparatus of claim 4, wherein said containers are elongated and extend through a plurality of said plates.

6. The apparatus of claim 5, wherein said containers are filled with a particulate, solid catalyst to form said catalytic reaction zone.

7. An apparatus for use in a distillation column to provide concurrent reaction with distillation of fluid streams flowing through said distillation column, said apparatus comprising:
    a plurality of spaced apart plates for presenting a fractional distillation and mass transfer zone;
    a plurality of containers extending between said plates for containing in a fixed configuration a catalyst to form a catalytic reaction zone, said containers providing a primary flow path for liquid streams flowing between said spaced apart plates; and
    an interference structure within at least some of said containers for slowing the rate of fall of liquid gravitating through the associated containers.

8. An apparatus for use in a distillation column to provide concurrent reaction with distillation of fluid streams flowing through said distillation column, said apparatus comprising:
    a plurality of spaced apart plates for presenting a fractional distillation and mass transfer zone;
    a plurality of containers extending between said plates for containing in a fixed configuration a catalyst to form a catalytic reaction zone, said containers providing a primary flow path for liquid streams flowing between said spaced apart plates; and
    means within at least some of the containers for presenting an open area within said catalytic reaction zone of the associated containers where said catalyst is to be contained, said open area being accessible by liquid flowing radially through said associated containers.

9. The apparatus as set forth in claim 8, wherein is included means for presenting a liquid accumulation zone downwardly spaced from and in open communication with said open area, said liquid accumulation zone being characterized by transferring liquid radially outward.

10. The apparatus as set forth in claim 9, wherein is included means for diverting the flow of liquid to the outer wall of said associated containers at a point above said open area.

11. The apparatus as set forth in claim 10, wherein said open area has a larger cross-sectional dimension than the corresponding dimension of said liquid accumulation zone.

12. The apparatus as set forth in claim 10, wherein said container walls, said open area presenting means and said means presenting said liquid accumulation zone are all comprised of a mesh material.

13. The apparatus as set forth in claim 12, wherein said liquid accumulation zone extends from a point above said plate means to a point below said plate means.

14. The apparatus as set forth in claim 10, wherein said liquid accumulation zone commences at a point above a plate and extends to a point above the next lower plate.

15. An apparatus for use in a distillation column to provide concurrent reaction with distillation of fluid streams flowing through said distillation column, said apparatus comprising:
- a plurality of generally horizontally extending and vertically spaced apart plates for presenting a fractional distillation and mass transfer zone;
- a plurality of containers extending between said plates for containing in a fixed configuration a catalyst to form a plurality of generally vertically extending catalytic reaction zones, said containers providing a primary flow path for liquid streams flowing between said spaced apart plates; and
- a solid member in surrounding relationship to at least some of said containers and having upper and lower ends, each said member being spaced from an associated container and coupled with the latter in fluid tight relationship at the lower end of the member.

16. The apparatus of claim 15, wherein said containers have a permeable outer wall.

17. The apparatus of claim 16, wherein said container outer walls comprise a screen material.

18. The apparatus of claim 15, wherein said plates contain a plurality of apertures sized for receiving said containers to allow said containers to extend through the plates.

19. The apparatus of claim 18, wherein said containers are elongated and extend through a plurality of said plates.

20. The apparatus of claim 19, wherein said containers are filled with a particulate, solid catalyst to form said catalytic reaction zone.

21. An apparatus for use in a distillation column to provide concurrent reaction with distillation of fluid streams flowing through said distillation column, said apparatus comprising:
- a plurality of generally horizontally extending and vertically spaced apart plates for presenting a fractional distillation and mass transfer zone;
- a plurality of containers extending between said plates for containing in a fixed configuration a catalyst to form a plurality of generally vertically extending catalytic reaction zones, said containers providing a primary flow path for liquid streams flowing between said spaced apart plates; and
- an interference structure within at least some of said containers for slowing the rate of fall of liquid gravitating through the associated containers.

22. An apparatus for use in a distillation column to provide concurrent reaction with distillation of fluid streams flowing through said distillation column, said apparatus comprising:
- a plurality of generally horizontally extending and vertically spaced apart plates for presenting a fractional distillation and mass transfer zone;
- a plurality of containers extending between said plates for containing in a fixed configuration a catalyst to form a plurality of generally vertically extending catalytic reaction zones, said containers providing a primary flow path for liquid streams flowing between said spaced apart plates; and
- means within at least some of the containers for presenting an open area within said catalytic reaction zones of the associated containers where said catalyst is to be contained, said area being accessible by liquid flowing radially through said associated containers.

23. The apparatus of claim 22, wherein is included means for presenting a liquid accumulation zone downwardly spaced from and in open communication with said open area, said liquid accumulation zone being characterized by transferring liquid radially outward.

24. The apparatus of claim 23, wherein is included means for diverting the flow of liquid to the outer wall of said associated container at a point above said open area.

25. The apparatus of claim 24, wherein said open area has a larger cross-sectional dimension than the corresponding dimension of said liquid accumulation zone.

26. The apparatus of claim 24, wherein said container walls, said open area presenting means and said means presenting said liquid accumulation zone are all comprised of mesh material.

27. The apparatus of claim 26, wherein said liquid accumulation zone extends from a point above said plate means to a point below said plate means.

28. The apparatus of claim 24, wherein said liquid accumulation zone commences at a point above a plate and extends to a point above the next lower plate.

* * * * *